(12) United States Patent
Ishimine et al.

(10) Patent No.: US 10,737,361 B2
(45) Date of Patent: Aug. 11, 2020

(54) MACHINING JIG AND MACHINING METHOD

(71) Applicants: Sumitomo Electric Industries, Ltd., Osaka-shi (JP); Sumitomo Electric Sintered Alloy, Ltd., Takahashi-shi (JP)

(72) Inventors: Tomoyuki Ishimine, Itami (JP); Hirofumi Kiguchi, Takahashi (JP)

(73) Assignees: SUMITOMO ELECTRIC INDUSTRIES, LTD., Osaka (JP); SUMITOMO ELECTRIC SINTERED ALLOY, LTD., Okayama (JP)

( * ) Notice: Subject to any disclaimer, the term of this patent is extended or adjusted under 35 U.S.C. 154(b) by 0 days.

(21) Appl. No.: 16/317,095

(22) PCT Filed: Jun. 7, 2017

(86) PCT No.: PCT/JP2017/021045
§ 371 (c)(1),
(2) Date: Jan. 11, 2019

(87) PCT Pub. No.: WO2018/012149
PCT Pub. Date: Jan. 18, 2018

(65) Prior Publication Data
US 2019/0314941 A1   Oct. 17, 2019

(30) Foreign Application Priority Data

Jul. 12, 2016   (JP) ................... 2016-138043

(51) Int. Cl.
*B23Q 3/06*   (2006.01)
*B23C 1/00*   (2006.01)
(Continued)

(52) U.S. Cl.
CPC .............. *B23Q 3/06* (2013.01); *B23C 1/00* (2013.01); *B23B 31/20* (2013.01); *B23Q 3/062* (2013.01);
(Continued)

(58) Field of Classification Search
CPC .......... B23Q 3/062; B23Q 3/06; B23B 31/20; B23C 1/00; B25B 1/24; Y10T 279/17307; Y10T 279/17521; Y10T 279/17589
(Continued)

(56) References Cited

U.S. PATENT DOCUMENTS

| 2,210,993 A | * | 8/1940 | Weatherhead, Jr. | .... B23B 31/20 228/161 |
| 2,728,579 A | * | 12/1955 | Djidich | ................. B23B 31/201 279/43 |

(Continued)

FOREIGN PATENT DOCUMENTS

| CN | 201889651 U | 7/2011 |
| CN | 203357098 U | 12/2013 |

(Continued)

*Primary Examiner* — Alan Snyder
*Assistant Examiner* — Yasir A Diab
(74) *Attorney, Agent, or Firm* — Renner, Otto, Boisselle & Sklar, LLP

(57) ABSTRACT

A machining jig holds a workpiece with respect to a tool that partially removes an outer peripheral surface of the workpiece. The machining jig includes a first jig including an inner peripheral surface having a shape similar to a contour of the workpiece and an outer peripheral surface including a first inclined section inclined with respect to an axial
(Continued)

direction of the workpiece; a second jig including an inner peripheral surface including a second inclined section configured to be fitted to the first inclined section; a base to which the second jig is coaxially fixed; and a sliding mechanism that enables a large-diameter portion of the first inclined section and a small-diameter portion of the second inclined section to move toward and away from each other. The sliding mechanism of the machining jig causes the small-diameter portion of the second inclined section to press the large-diameter portion of the first inclined section so that compressive stress is applied to the outer peripheral surface of the workpiece at a position near a portion to be removed by the tool.

8 Claims, 6 Drawing Sheets

(51) Int. Cl.
   *B23B 31/20* (2006.01)
   *B25B 1/24* (2006.01)

(52) U.S. Cl.
   CPC ......... *B25B 1/24* (2013.01); *Y10T 279/17598* (2015.01)

(58) Field of Classification Search
   USPC .......................................... 269/50, 101, 152
   See application file for complete search history.

(56) References Cited

U.S. PATENT DOCUMENTS

| | | | | |
|---|---|---|---|---|
| 2,816,301 | A | * | 12/1957 | Hopkins ................ B23Q 1/763 408/84 |
| 2,951,320 | A | * | 9/1960 | Menard ................ B24B 41/061 451/397 |
| 2,981,037 | A | * | 4/1961 | Terp ...................... B23B 31/025 451/47 |
| 3,079,736 | A | * | 3/1963 | Kratt ..................... B24B 13/005 451/384 |
| 3,751,027 | A | * | 8/1973 | Giles ..................... B23B 31/201 269/152 |
| 3,791,661 | A | | 2/1974 | Giles |
| 5,077,876 | A | * | 1/1992 | McConkey ........... B23B 31/207 279/50 |
| 5,251,510 | A | * | 10/1993 | Trim ..................... B23B 29/046 279/133 |
| 2006/0131822 | A1 | * | 6/2006 | Lindstrom ............ B23B 31/208 279/53 |
| 2013/0228960 | A1 | * | 9/2013 | Ochi ....................... B23F 23/08 269/20 |

FOREIGN PATENT DOCUMENTS

| | | |
|---|---|---|
| CN | 203778898 U | 8/2014 |
| CN | 204868271 U | 12/2015 |
| CN | 205021244 U | 2/2016 |
| CN | 205096650 U | 3/2016 |
| EP | 2631028 A1 | 8/2013 |
| JP | 2004-323939 A | 11/2004 |

* cited by examiner

Sample No.1-1

Sample No. 1-11

MACHINING JIG AND MACHINING METHOD

TECHNICAL FIELD

The present disclosure relates to a machining jig and a machining method. The present application claims priority based on Japanese Patent Application No. 2016-138043 filed on Jul. 12, 2016, the entire contents of which are incorporated herein.

BACKGROUND ART

PTL 1 discloses a method for manufacturing a component that cannot be easily formed by molding. According to this method, a molded body obtained by lubrication molding (molding using a mold to which lubricant is applied) of a powder material is subjected to machining, such as cutting or grinding. Then, the machined molded body is sintered. The molded body can be easily machined because the hardness thereof is lower than that of the sintered body.

CITATION LIST

Patent Literature

PTL 1: Japanese Unexamined Patent Application Publication No. 2004-323939

SUMMARY OF INVENTION

A machining jig according to the present disclosure holds a workpiece with respect to a tool that partially removes an outer peripheral surface of the workpiece. The machining jig includes a first jig including an inner peripheral surface having a shape similar to a contour of the workpiece and an outer peripheral surface including a first inclined section inclined with respect to an axial direction of the workpiece; a second jig including an inner peripheral surface including a second inclined section configured to be fitted to the first inclined section; a base to which the second jig is coaxially fixed; and a sliding mechanism that enables a large-diameter portion of the first inclined section and a small-diameter portion of the second inclined section to move toward and away from each other. The sliding mechanism of the machining jig causes the small-diameter portion of the second inclined section to press the large-diameter portion of the first inclined section so that compressive stress is applied to the outer peripheral surface of the workpiece at a position near a portion to be removed by the tool.

A machining method according to the present disclosure is a method for partially removing an outer peripheral surface of a workpiece by using a tool. The machining method includes applying compressive stress to the outer peripheral surface of the workpiece at a position near a portion to be removed by the tool by using the machining jig according to the present disclosure and machining the workpiece while the compressive stress is applied.

DESCRIPTION OF EMBODIMENTS

Figure 1:
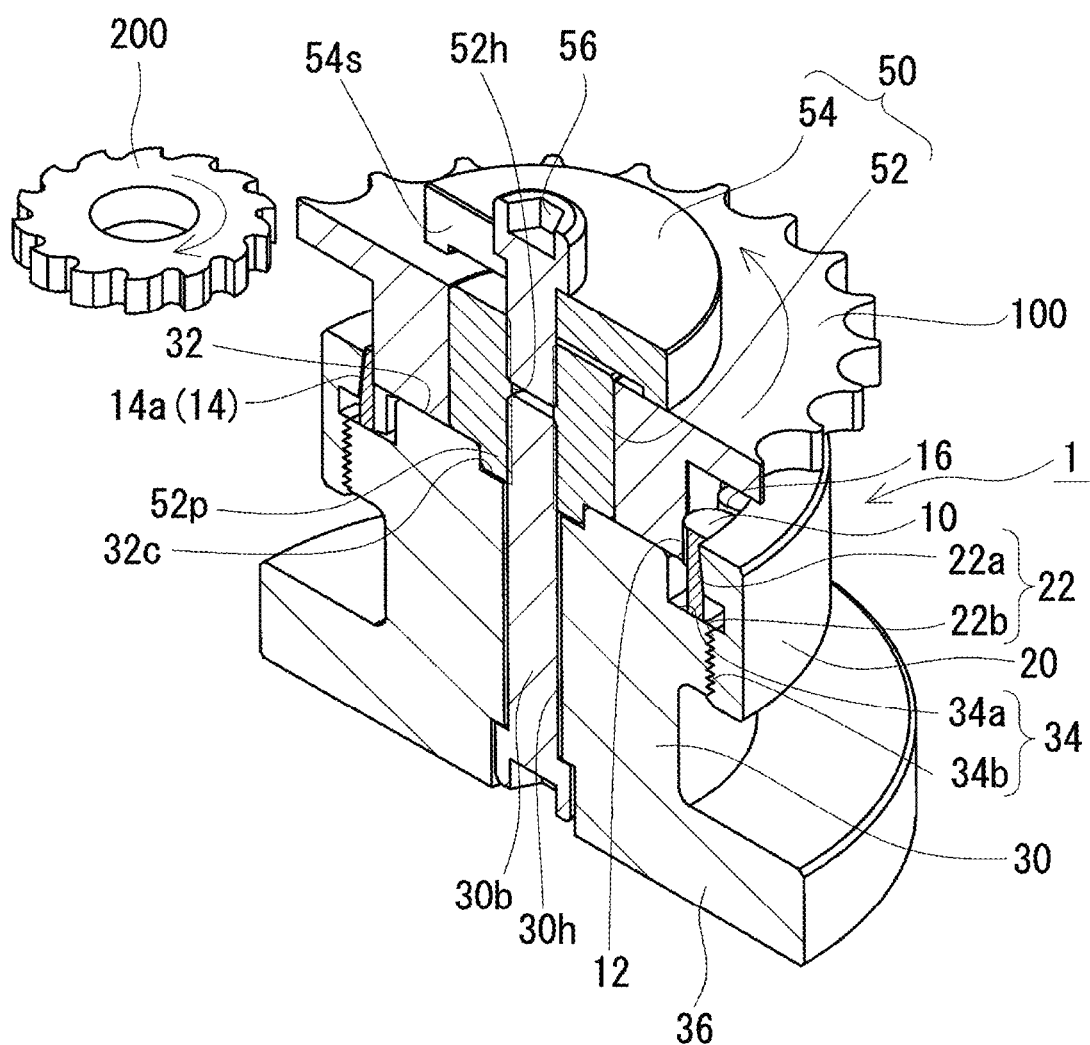
FIG. 1 is a schematic sectional perspective view of a machining jig according to a first embodiment.

To produce a sintered component more efficiently, machining under severe conditions, for example, at a higher machining speed, is desired. However, when a molded body is machined under severe conditions before being sintered, there is a risk that the molded body will be chipped and the quality thereof cannot be maintained at a satisfactory level.

Accordingly, one object is to provide a machining jig with which chipping during machining can be reduced and a high-quality machined product can be efficiently produced. Another object is to provide a machining method by which chipping during machining can be reduced and a high-quality machined product can be efficiently produced.

Embodiments of the present disclosure will now be described.

DESCRIPTION OF EMBODIMENTS (1) A machining jig according to the present disclosure holds a workpiece with respect to a tool that partially removes an outer peripheral surface of the workpiece. The machining jig includes a first jig including an inner peripheral surface having a shape similar to a contour of the workpiece and an outer peripheral surface including a first inclined section inclined with respect to an axial direction of the workpiece; a second jig including an inner peripheral surface including a second inclined section configured to be fitted to the first inclined section; a base to which the second jig is coaxially fixed; and a sliding mechanism that enables a large-diameter portion of the first inclined section and a small-diameter portion of the second inclined section to move toward and away from each other. The sliding mechanism causes the small-diameter portion of the second inclined section to press the large-diameter portion of the first inclined section so that compressive stress is applied to the outer peripheral surface of the workpiece at a position near a portion to be removed by the tool.

The machining jig is capable of applying compressive stress to the outer peripheral surface of the workpiece at a position near the portion to be removed by the tool. Therefore, the occurrence of chipping, for example, of the workpiece during machining can be reduced by machining the workpiece while applying compressive stress to the workpiece. In general, when a workpiece is subjected to machining, such as cutting or grinding, tensile stress is applied to the surface of the workpiece in a region near the portion being removed by the tool. The tensile stress serves to sever the bond between powder particles that constitute the workpiece, and causes chipping, for example, of the workpiece during machining. By applying compressive stress to the workpiece by using the above-described machining jig, the tensile stress generated during machining can be substantially canceled. Accordingly, chipping, for example, during machining can be reduced and a high-quality machined product can be obtained.

The sliding mechanism of the above-described machining jig causes the small-diameter portion of the second inclined section to press the large-diameter portion of the first inclined section, so that the inner peripheral surface of the first jig easily applies the compressive stress to the workpiece. Since the inner peripheral surface of the first jig, which directly applies the compressive stress to the workpiece, has a shape similar to the contour of the workpiece, the compressive stress can be continuously applied to the workpiece over the entire circumference. Since the machining jig enables the workpiece to be machined while compressive stress is applied thereto, the occurrence of chipping, for example, can be reduced even when the workpiece is machined under severe conditions, for example, at a high machining speed, and a high-quality machined product can be efficiently produced.

(2) In one example of the above-described machining jig, the first jig has a slit formed in the inner peripheral surface of the first jig along an axial direction thereof so that a diameter of the first jig decreases as the large-diameter portion of the first inclined section approaches the small-diameter portion of the second inclined section.

When the first jig has the slit, the diameter of the first jig easily decreases when the large-diameter portion of the first inclined section approaches the small-diameter portion of the second inclined section, and the compressive stress can be easily applied to the workpiece by the first jig.

(3) In one example of the above-described machining jig, the sliding mechanism includes an internal thread portion formed continuously from the large-diameter portion of the second inclined section and an external thread portion that is provided on the base and meshes with the internal thread portion.

The above-described machining jig enables appropriate machining of the portion of the outer peripheral surface of the workpiece to be removed by the tool by holding the workpiece with respect to the tool such that the inner peripheral surface of the first jig applies the compressive stress to the workpiece at a position near the portion to be removed. Since the sliding mechanism is provided on the second jig and the base, the workpiece that is held can be prevented from being displaced with respect to the tool when the sliding mechanism causes the small-diameter portion of the second inclined section to press the large-diameter portion of the first inclined section. Therefore, the portion of the outer peripheral surface of the workpiece to be removed by the tool can be reliably machined, and a high-quality machined product can be easily obtained.

(4) In one example of the above-described machining jig, the sliding mechanism includes an external thread portion provided on the first inclined section and an internal thread portion that is provided on the second inclined section and meshes with the external thread portion.

When the sliding mechanism is provided on the first jig and the second jig, the second jig can be formed integrally with the base to which the second jig is fixed. Accordingly, the machining jig may be formed of two members, which are the first jig and the second jig (having the function of the base).

(5) In one example of the above-described machining jig, the machining jig is used to form the outer peripheral surface of the workpiece into an undercut shape.

The above-described machining jig may be advantageously used when machining an object into an undercut shape that cannot be easily formed by molding. By using the machining jig, a high-quality machined product having an undercut shape and having very small amount of chipping, or preferably substantially no chipping, can be obtained.

(6) A machining method according to the present disclosure is a method for partially removing an outer peripheral surface of a workpiece by using a tool. The machining method includes applying compressive stress to the outer peripheral surface of the workpiece at a position near a portion to be removed by the tool by using the machining jig according to any one of (1) to (5) and machining the workpiece while the compressive stress is applied.

According to the above-described machining method, the workpiece is machined while the compressive stress is applied to the workpiece by using the above-described machining jig. Therefore, chipping, for example, during machining can be reduced and a high-quality machined product can be obtained.

DETAILED DESCRIPTION OF EMBODIMENTS

Machining jigs according to embodiments of the present disclosure and machining methods using the machining jigs will now be described in detail with reference to the drawings. In the drawings, the same reference signs denote the same components.

First Embodiment

A machining jig 1 according to a first embodiment will be described with reference to FIGS. 1 to 4. As illustrated in FIG. 1, the machining jig 1 according to the first embodiment holds a workpiece 100 with respect to a tool 200 that partially removes an outer peripheral surface of the workpiece 100. The machining jig 1 includes a first jig 10, a second jig 20, a base 30, and a sliding mechanism 40. The first jig 10 includes an inner peripheral surface 12 having a shape similar to the contour of the workpiece 100 and an outer peripheral surface 14 including a first inclined section 14a. The second jig 20 is disposed outside the first jig 10, and includes an inner peripheral surface 22 including a second inclined section 22a fitted to the first inclined section 14a. The machining jig 1 according to the first embodiment is characterized in that a small-diameter portion 22aS (FIG. 3) of the second inclined section 22a presses a large-diameter portion 14aL (FIG. 3) of the first inclined section 14a so that compressive stress is applied to the outer peripheral surface of the workpiece 100 at a position near a portion to be removed by the tool 200. When the workpiece 100 is machined while the compressive stress is applied thereto, chipping, for example, during machining can be reduced and a high-quality machined product can be obtained. In the following description, the structures of the workpiece 100 and a machined product 300 obtained by using the machining jig 1 according to the first embodiment will be described first, and then each component of the machining jig 1 will be described in detail.

[Workpiece and Machined Product]

Figure 4:
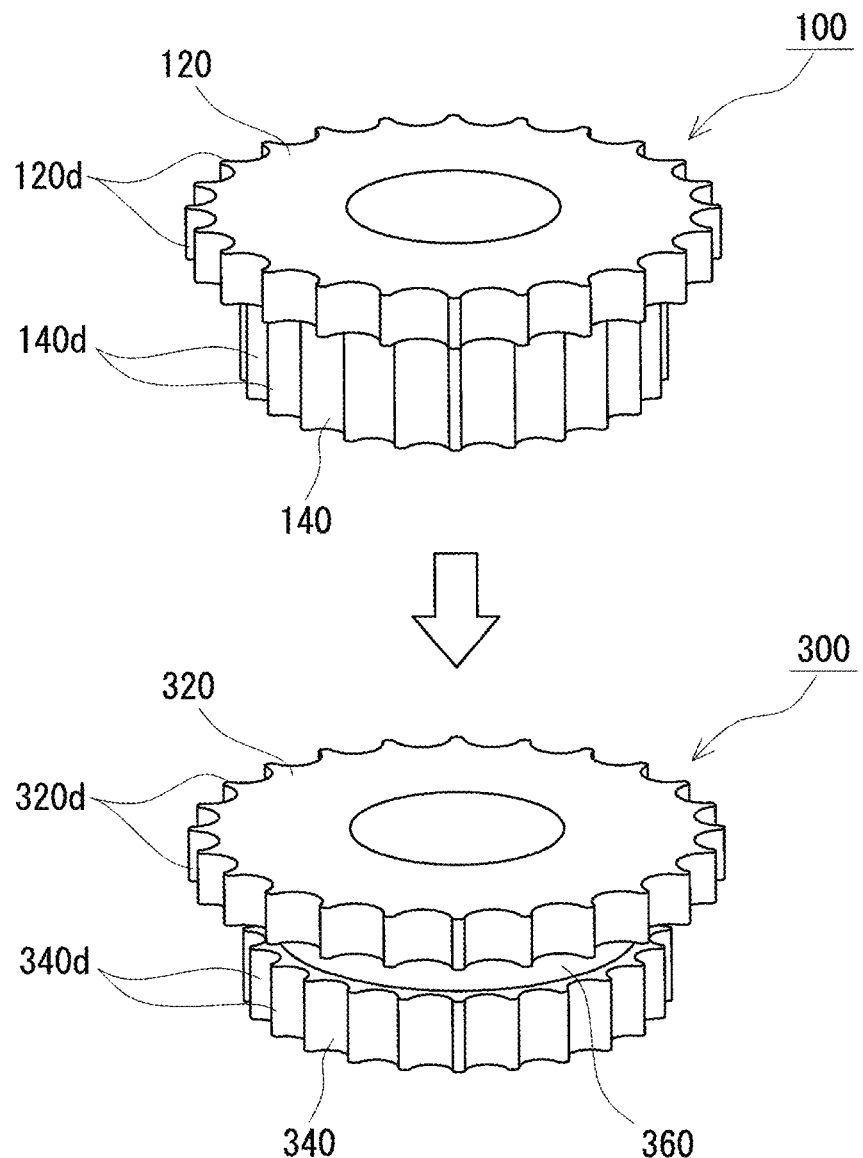
FIG. 4 shows a schematic perspective view of a workpiece to be machined by using the machining jig according to the first embodiment and a schematic perspective view of a product obtained by machining the workpiece.

As illustrated in FIGS. 1 and 4, the workpiece 100 according to the first embodiment is a molded body (molded powder compact that is not sintered) including two portions of different diameters having corrugated surfaces. As shown in the upper part of FIG. 4, the workpiece 100 includes a large-diameter section 120 including large teeth 120d that form a corrugated surface at one end thereof and a small-diameter section 140 extending from the other end of the workpiece 100 to the large-diameter section 120 and including small teeth 140d that form a corrugated surface. In the first embodiment, the outer peripheral surface of the small-diameter section 140 is machined in a region adjacent to the large-diameter section 120 so that the outer peripheral surface of the workpiece 100 including the small teeth 140*d* is partially removed. Thus, the machined product 300 (double sprocket wheel) shown in the lower part of FIG. 4 is obtained. The machined product 300 includes a large-diameter section 320 (similar to the large-diameter section 120) including large teeth 320*d* (similar to the large teeth 120*d*) along the outer periphery at one end thereof, a small-diameter section 340 (similar to the small-diameter section 140) including small teeth 340*d* (similar to the small teeth 140*d*) along the outer periphery at the other end thereof, and a cylindrical portion 360 disposed between the large-diameter section 320 and the small-diameter section 340 and having a diameter less than that of the small-diameter section 340.

[Machining Jig]

First Jig

The first jig 10 is a tubular member having open ends (see FIG. 2), and includes the inner peripheral surface 12 having a shape similar to the contour of the workpiece 100 and the outer peripheral surface 14 including the first inclined section 14*a* inclined with respect to the axial direction of the workpiece 100. As illustrated in FIG. 3, the first jig 10 has a function of applying compressive stress to the outer peripheral surface of the workpiece 100 by coming into tight contact therewith when the first jig 10 is pressed inward by the second jig 20.

Figure 2:
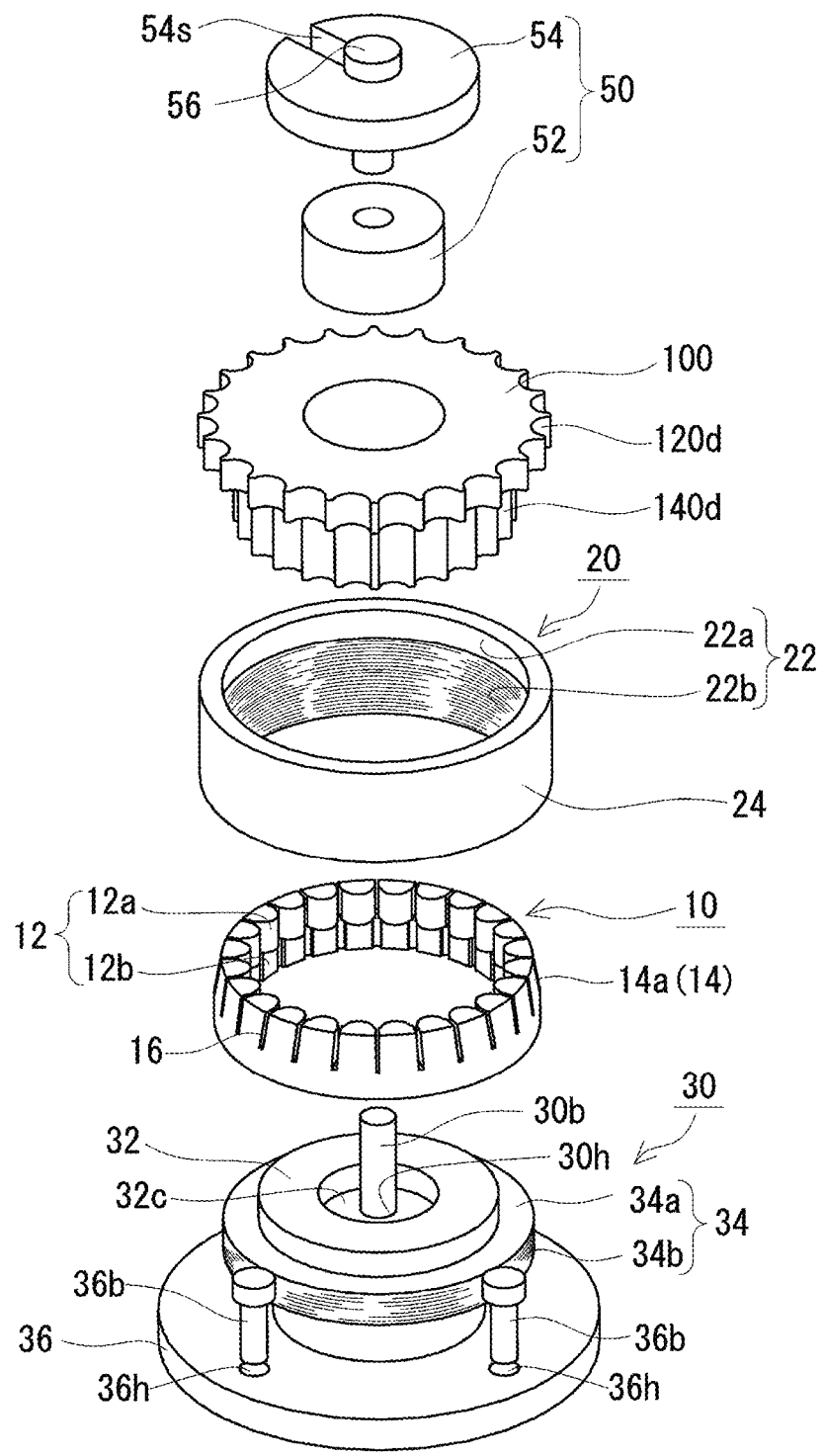
FIG. 2 is a schematic exploded perspective view of the machining jig according to the first embodiment.
Figure 3:
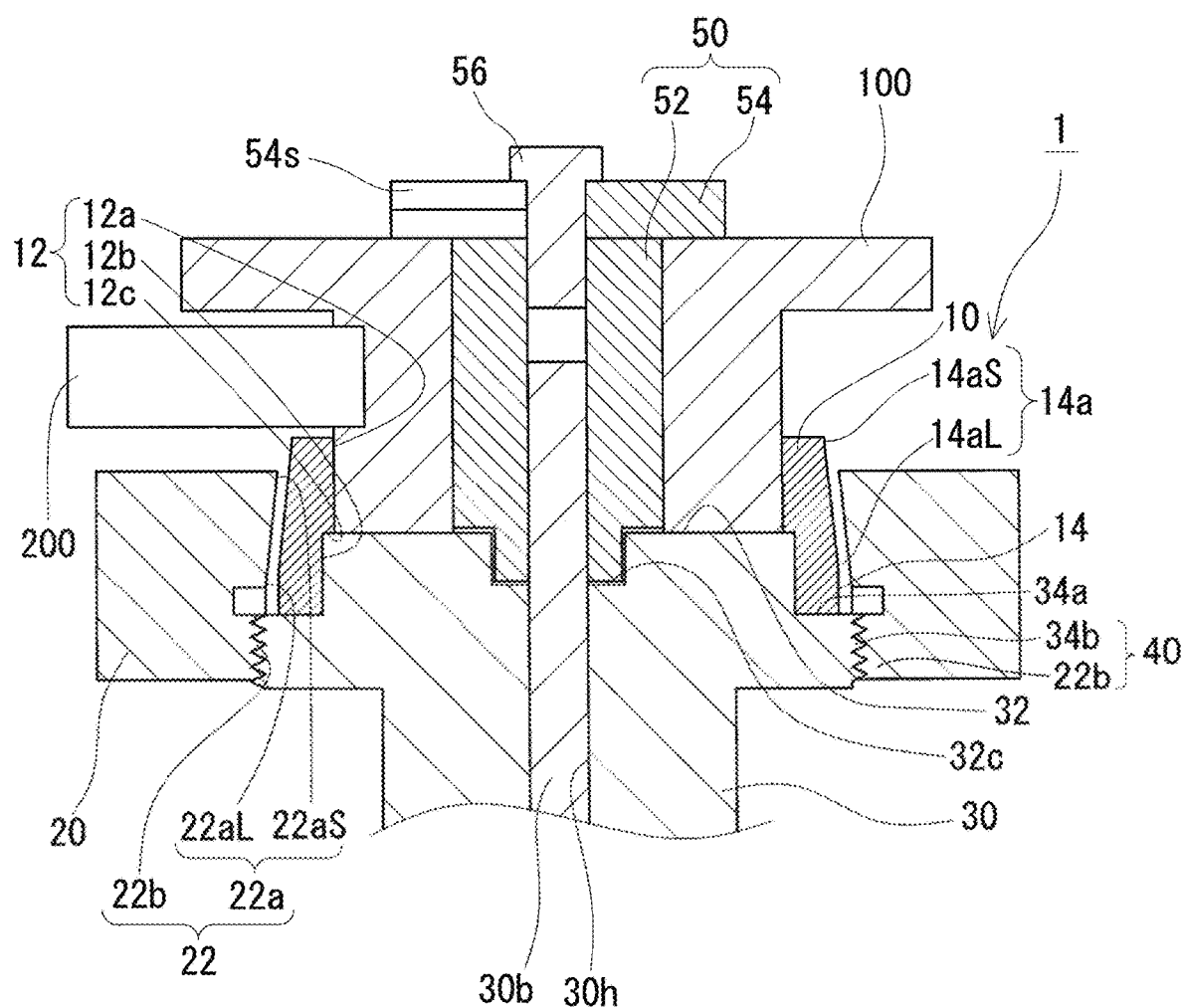
FIG. 3 is a schematic sectional view of the machining jig according to the first embodiment.

As illustrated in FIGS. 1 and 2, the inner peripheral surface 12 of the first jig 10 has a shape similar to the contour of the workpiece 100. In this embodiment, the inner peripheral surface 12 has a shape similar to the contour of the small-diameter section 140 (FIG. 4) of the workpiece 100, and has a shape corresponding to the shape of teeth of a sprocket. The inner peripheral surface 12 has a shape similar to the contour of the workpiece 100 over the entire length thereof in the axial direction (vertical direction in FIG. 1). A portion of the inner peripheral surface 12 that does not come into contact with the workpiece 100 may have a smooth surface as long as at least a portion of the inner peripheral surface 12 that comes into contact with the workpiece 100 has a shape similar to the contour of the workpiece 100.

A portion of the inner peripheral surface 12 of the first jig 10 in the axial direction serves as a compression surface that applies compressive stress to the workpiece 100 by coming into contact therewith. In this embodiment, as illustrated in FIG. 3, the inner peripheral surface 12 includes a compression surface 12*a* and a fitting surface 12*b*. The compression surface 12*a*, which extends from one end (top end in FIG. 3) to a substantially central position, applies compressive stress to the workpiece 100 by coming into contact therewith. The fitting surface 12*b*, which extends from the substantially central position to the other end (bottom end in FIG. 3), does not come into contact with the workpiece 100 and is fitted to the base 30. The inner peripheral surface 12 also includes a step surface 12*c* (FIG. 3) that forms a step of a size corresponding to the tooth depth between the compression surface 12*a* and the fitting surface 12*b*.

As illustrated in FIGS. 1 and 3, the outer peripheral surface 14 of the first jig 10 includes the first inclined section 14*a* inclined with respect to the axial direction of the workpiece 100. The first inclined section 14*a* is inclined so that the diameter thereof continuously increases with increasing distance in the direction from the compression surface 12*a* toward the fitting surface 12*b* of the inner peripheral surface 12. In this embodiment, the first inclined section 14*a* is continuously inclined over the entire length of the outer peripheral surface 14 from one end to the other end (over the entire length in the axial direction of the workpiece 100) and has a truncated conical shape. It is not necessary that a portion of the first inclined section 14*a* that faces the fitting surface 12*b* of the inner peripheral surface 12 be inclined as long as at least a portion of the first inclined section 14*a* that faces the compression surface 12*a* of the inner peripheral surface 12 is inclined.

The first jig 10 has such a height that when the first jig 10 is placed at a predetermined position (on a placement surface 34*a* of the base 30 described below in this embodiment), a portion of the outer peripheral surface of the workpiece 100 that is to be removed by the tool 200 is exposed and the compression surface 12*a* included in the inner peripheral surface 12 comes into contact with the workpiece 100 at a position near the portion to be removed (see FIG. 1).

As illustrated in FIGS. 1 and 2, the first jig 10 has slits 16 formed in the inner peripheral surface 12 so as to extend from the compression surface 12*a* toward the fitting surface 12*b* at positions between the teeth. When the first jig 10 is pressed inward by the second jig 20, the widths of the slits 16 are reduced to facilitate reduction in the diameter of the first jig 10. When the diameter of the first jig 10 is reduced, the inner peripheral surface 12 of the first jig 10 easily comes into tight contact with the outer peripheral surface of the workpiece 100 and applies compressive stress to the workpiece 100.

Second Jig

The second jig 20 is a tubular member having open ends (see FIG. 2), and includes the inner peripheral surface 22 including the second inclined section 22*a* fitted to the first inclined section 14*a*. As illustrated in FIG. 3, the second jig 20 is rotatably fixed to the base 30 with the sliding mechanism 40 provided therebetween, and the sliding mechanism 40 enables the second jig 20 to press the first jig 10 inward. More specifically, the small-diameter portion 22*a*S of the second inclined section 22*a* presses the large-diameter portion 14*a*L of the first inclined section 14*a*.

As illustrated in FIGS. 1 and 3, similar to the first inclined section 14*a* that is inclined, the second inclined section 22*a* is inclined so that the diameter thereof continuously increases with increasing distance in the direction from one end toward the other end of the inner peripheral surface 22. The length of the second inclined section 22*a* is preferably greater than or equal to half the length of the inner peripheral surface 22 in the direction along the first inclined section 14*a*. It is not necessary that the length of the second inclined section 22*a* be equivalent to the length of the first inclined section 14*a* as long as the second inclined section 22*a* is long enough so that the small-diameter portion 22*a*S thereof is capable of pressing the small-diameter portion 14*a*S of the first jig 10 inward when slid toward the small-diameter portion 14*a*S of the first inclined section 14*a*.

As illustrated in FIGS. 1 and 3, the inner peripheral surface 22 of the second jig 20 has an internal thread portion 22*b* that continues from the large-diameter portion 22*a*L of the second inclined section 22*a*. The internal thread portion 22*b* meshes with an external thread portion 34*b* formed on the base 30 described below. The internal thread portion 22*b* and the external thread portion 34*b* enable the second jig 20 to move in the vertical direction (vertical direction in FIGS. 1 and 3) when the second jig 20 is rotated around the base 30.

The outer peripheral surface 24 of the second jig 20 has a constant diameter from one end to the other end, and may have any shape. When the outer peripheral surface 24 is a rough surface or has projections (neither is shown), the second jig 20 can be easily rotated around the base 30.

Base

The second jig 20 is coaxially fixed to the base 30 with the sliding mechanism 40 provided therebetween. The base 30 is a tubular member having a through hole 30h that extends therethrough between both ends thereof (see FIG. 2), and includes a top surface 32 on which the workpiece 100 is placed and a projecting portion 34 including the external thread portion 34b on the outer peripheral surface thereof. The external thread portion 34b meshes with the internal thread portion 22b of the second jig 20. As illustrated in FIG. 3, the base 30 is configured so that the internal thread portion 22b and the external thread portion 34b enable the second jig 20 to rotate around the base 30 so that the second jig 20 moves in the vertical direction (vertical direction in FIG. 3).

Since the second jig 20 is coaxially fixed to the base 30, the base 30, the second jig 20, the first jig 10, and the workpiece 100 are all coaxially arranged. As described below, the base 30 is placed on a mounting object (not shown) by inserting a shaft 30b therethrough. Since the base 30, the second jig 20, the first jig 10, and the workpiece 100 are all coaxially arranged, the workpiece 100 can be rotated about the shaft 30b.

The workpiece 100 is placed on the top surface 32 of the base 30. A recess 32c is formed in the top surface 32 in a region around the through hole 30h. A retaining portion 50, which will be described below, is fixed to the recess 32c. The workpiece 100 can be positioned with respect to the base 30 by placing the workpiece 100 on the top surface 32 of the base 30. Accordingly, by positioning the tool 200 with respect to the base 30, the workpiece 100 can be positioned with respect to the tool 200, and an appropriate portion of the workpiece 100 can be machined.

The projecting portion 34 of the base 30 continuously project from the outer peripheral surface of the base 30 over the entire circumference thereof, and the external thread portion 34b is formed on the projecting end surface of the projecting portion 34. The top surface of the projecting portion 34 is flat, and serves as the placement surface 34a on which the first jig 10 can be placed. When the first jig 10 is placed on the placement surface 34a, the compression surface 12a of the first jig 10 is positioned above the top surface 32 of the base 30, so that the compressive stress can be reliably applied to the outer peripheral surface of the workpiece 100 by the compression surface 12a of the first jig 10.

The base 30 includes an attachment portion 36 having insertion holes 36h for receiving bolts 36b used to fix a bottom portion of the base 30 to the mounting object (not shown). The mounting object is, for example, a rotary table that can be rotated by a drive source, such as a motor (not shown). When the shaft 30b is inserted through the through hole 30h in the base 30 and the base 30 is fixed to the rotatable mounting object, the base 30 can be rotated about the shaft 30b. By rotating the base 30, the workpiece 100 placed on the top surface 32 of the base 30 can also be rotated about the shaft 30b.

Sliding Mechanism

The sliding mechanism 40 includes the internal thread portion 22b provided on the second jig 20 and the external thread portion 34b provided on the base 30. As illustrated in FIG. 3, the sliding mechanism 40 has a function of enabling the large-diameter portion 14aL of the first inclined section 14a and the small-diameter portion 22aS of the second inclined section 22a to move toward and away from each other.

The internal thread portion 22b and the external thread portion 34b enable the second jig 20 to move in the vertical direction (vertical direction in FIGS. 1 and 3) when the second jig 20 is rotated around the base 30. When the second jig 20 is moved in the vertical direction, the small-diameter portion 22aS of the second inclined section 22a and the large-diameter portion 14aL of the first inclined section 14a move toward or away from each other. When the small-diameter portion 22aS of the second inclined section 22a and the large-diameter portion 14aL of the first inclined section 14a approach each other, the small-diameter portion 22aS of the second inclined section 22a presses the large-diameter portion 14aL of the first inclined section 14a, so that the first jig 10 is pressed inward.

Others

As illustrated in FIGS. 1 to 3, the machining jig 1 may further include the retaining portion 50 that retains the inner peripheral surface and the top surface of the workpiece 100. The retaining portion 50 includes an inner retaining portion 52 that is inserted in the workpiece 100 and a top retaining portion 54 that retains the top surface of the workpiece 100.

The inner retaining portion 52 has a diameter less than or equivalent to the inner diameter of the workpiece 100 and a length less than or equivalent to the length of the workpiece 100 in the axial direction. The inner retaining portion 52 includes a projection 52p that can be fitted to the recess 32c formed in the top surface 32 of the base 30. The inner retaining portion 52 also has a through hole 52h having an internal thread on the inner peripheral surface thereof An external thread is formed on an end portion of the shaft 30b. The inner retaining portion 52 can be fixed to the base 30 by fitting the projection 52p of the inner retaining portion 52 to the recess 32c in the base 30, inserting the shaft 30b into the through hole 30h in the base 30, and meshing the external thread on the shaft 30b with the internal thread in the through hole 52h in the inner retaining portion 52. The workpiece 100 can be fixed to the base 30 in a positioned manner by placing the workpiece 100 on the inner retaining portion 52.

The workpiece 100 can be more easily fixed to the base 30 in a positioned manner by placing the top retaining portion 54 on the top surface of the workpiece 100 fixed to the base 30. The top retaining portion 54 has a slit 54s. A retaining shaft 56 that is insertable into the slit 54s and the through hole 52h in the inner retaining portion 52 has an external thread at an end thereof. The top retaining portion 54 can be retained by meshing the external thread on the retaining shaft 56 with the internal thread on the inner peripheral surface of the through hole 52h. Thus, the inner retaining portion 52 and the workpiece 100 can be fixed to the base 30.

[Use]

The above-described machining jig 1 may be advantageously used when machining, for example, cutting or grinding, the outer peripheral surface of the workpiece 100 which is, for example, a molded body obtained by molding a powder material (e.g., a molded body obtained by lubrication molding or by using powder to which lubricant is added) or a sintered body obtained by sintering the molded body. In particular, the machining jig 1 may be advantageously used when machining a molded body having a low hardness, and may also be advantageously used when machining an object into an undercut shape that cannot be easily formed by molding. A rotary cutting tool such as a milling cutter or an end mill may be used for cutting, and a grinding tool such as a grinding stone may be used for grinding.

[Machining Method]

A machining method according to the first embodiment includes a step of applying compressive stress to the outer peripheral surface of the workpiece 100 by using the above-described machining jig 1 and a step of machining the workpiece 100 at a position near the position at which the compressive stress is applied. In this embodiment, the base 30 is fixed to a rotatable mounting object, and the workpiece 100 is machined by using a rotatable and revolvable side cutter while the machining jig 1 is rotated, in other words, while the workpiece 100 is rotated.

Assume that the second jig 20 is screw-fastened to the base 30 and the first jig 10 is placed inside the second jig 20. Also, in this embodiment, the projection 52p of the inner retaining portion 52 is fitted to the recess 32c in the base 30, and the shaft 30b is inserted through the through hole 30h in the base 30 and the through hole 52h so that the inner retaining portion 52 is fixed to the base 30. Thus, the workpiece 100 can be roughly positioned when the workpiece 100 is placed on the machining jig 1.

Step of Applying Compressive Stress

First, the workpiece 100 is placed on the above-described machining jig 1. When the workpiece 100 is placed on the machining jig 1, the machining jig 1 is arranged so that the large-diameter portion 14aL of the first inclined section 14a and the small-diameter portion 22aS of the second inclined section 22a are apart from each other. At this time, the slits 16 in the first jig 10 are open and the first jig 10 has a large diameter.

In this state, the workpiece 100 can be easily placed inside the first jig 10.

The workpiece 100 is fitted between the inner peripheral surface 12 of the first jig 10 and the outer peripheral surface of the inner retaining portion 52, and placed on the top surface 32 of the base 30. In this embodiment, the workpiece 100 is positioned so that the teeth of the workpiece 100 correspond to the teeth of the first jig 10. Since the compression surface 12a of the first jig 10 is positioned above the top surface 32 of the base 30, the compression surface 12a of the first jig 10 reliably corresponds to the outer peripheral surface of the workpiece 100. In this state, a clearance is provided between the first jig 10 and the workpiece 100.

In this embodiment, the top retaining portion 54 is placed on the top surface of the workpiece 100 and the retaining shaft 56 is inserted into both the through hole 52h in the inner retaining portion 52 and the slit 54s in the top retaining portion 54. Thus, displacement that occurs between the machining jig 1 and the workpiece 100 can be easily reduced.

Next, the second jig 20 is rotated around the base 30 so that the second jig 20 is moved downward by the internal thread portion 22b and the external thread portion 34b (sliding mechanism 40). When the second jig 20 is moved downward, the small-diameter portion 22aS of the second inclined section 22a and the large-diameter portion 14aL of the first inclined section 14a approach each other. Accordingly, the small-diameter portion 22aS of the second inclined section 22a presses the large-diameter portion 14aL of the first inclined section 14a, so that the width of the slits 16 in the first jig 10 is reduced and that the diameter of the first jig 10 is also reduced. When the diameter of the first jig 10 is reduced, the inner peripheral surface 12 of the first jig 10 comes into tight contact with the outer peripheral surface of the workpiece 100 and applies compressive stress thereto.

In order for the outer peripheral surface of the workpiece 100 to receive compressive stress at a position near a portion to be removed by the tool 200, the machining jig 1 is appropriately configured such that the compression surface 12a of the first jig 10 comes into tight contact with the workpiece 100 at the position near the portion to be removed.

Machining Step

While the compressive stress is applied to the workpiece 100, the workpiece 100 is machined at a position near the position at which the compressive stress is applied. In this embodiment, machining is performed while the machining jig 1 is being rotated about the shaft 30b. In other words, the workpiece 100 is machined while being rotated about the center axis thereof. The tool 200 is a disc-shaped cutter that rotates and revolves around the workpiece 100, and is used to cut the workpiece 100 over the entire circumference thereof. The shaft 30b corresponds to the axis about which the workpiece 100 rotates and the axis about which the tool 200 revolves. The direction in which the workpiece 100 rotates (counterclockwise arrow in FIG. 1) and the direction in which the tool 200 rotates (clockwise arrow in FIG. 1) are opposite to each other. The direction in which the tool 200 rotates and the direction in which the tool 200 revolves are opposite to each other. The workpiece 100 receives inward compressive stress in the direction toward the shaft 30b.

Since the workpiece 100 can be machined while compressive stress is applied thereto, the occurrence of chipping, for example, can be reduced even under severe conditions, such as a high machining speed (for example, 150 m/min or higher or 160 m/min or higher). The machining time can be significantly reduced by increasing the machining speed. The machining time may be, for example, 20 s/piece or less or 15 s/piece or less, in particular, 10 s/piece or less.

The machining jig 1 according to the first embodiment is configured so that the large-diameter portion 14aL of the first inclined section 14a of the first jig 10 and the small-diameter portion 22aS of the second inclined section 22a of the second jig 20 can easily approach each other, and compressive stress can be easily applied to the outer peripheral surface of the workpiece 100 by the first jig 10. In particular, since the slits 16 are formed in the first jig 10, the diameter of the first jig 10 is reduced when the large-diameter portion 14aL of the first inclined section 14a and the small-diameter portion 22aS of the second inclined section 22a approach each other. Accordingly, the inner peripheral surface 12 of the first jig 10 easily comes into tight contact with the outer peripheral surface of the workpiece 100 and applies compressive stress thereto. Since the outer peripheral surface of the workpiece 100 is machined while compressive stress is applied thereto at a position near the portion to be removed by the tool 200, the occurrence of chipping of the workpiece 100, for example, during machining can be reduced.

In the case where the workpiece 100 is a sprocket, the workpiece 100 is intermittently machined because the teeth thereof that are adjacent to each other have gaps therebetween. The teeth are easily chipped during intermittent machining. Since the inner peripheral surface 12 of the first jig 10 of the above-described machining jig 1 has a shape similar to the contour of the workpiece 100, compressive stress can be continuously applied to the workpiece 100 over the entire circumference thereof. In other words, each tooth of the workpiece 100 receives the compressive stress at both sides thereof at which the tool 200 enters and leaves the tooth. Therefore, the occurrence of chipping of the teeth can be reduced even during intermittent machining. In the case where the tool 200 is a rotary cutting tool such as a milling cutter or an end mill, the teeth of the workpiece 100 and the teeth of the tool 200 come into contact with one another in a complex manner, and it is difficult to determine how the tensile stress generated during machining is applied to the workpiece 100. Since the machining jig 1 continuously applies the compressive stress to the workpiece 100 over the entire circumference thereof, the occurrence of chipping of the workpiece 100 can be reduced irrespective of the shape of the workpiece 100 and the type of the tool 200.

The machining jig 1 according to the first embodiment is configured such that the sliding mechanism 40, which enables the second jig 20 to move with respect to the base 30 in the vertical direction, is independent of the first inclined section 14a and the second inclined section 22a, which enable the second jig 20 to press the first jig 10 inward. Therefore, the compressive stress applied to the workpiece 100 by the first jig 10 is not influenced by the sliding mechanism 40. In other words, when the workpiece 100 is placed on the top surface 32 of the base 30, the position of the workpiece 100 with respect to the base 30 in the vertical direction is not affected by the operation of the sliding mechanism 40, that is, by the rotation of the second jig 20. Thus, the workpiece 100 can be positioned with respect to the tool 200 by positioning the tool 200 with respect to the base 30, and therefore the workpiece 100 can be machined at an appropriate position.

<<Modification 1-1>>

In the first embodiment, the workpiece 100 is a double sprocket wheel. However, the workpiece 100 may instead be, for example, a tubular or columnar member having no teeth, and the cross section thereof may be, for example, circular or polygonal. In such a case, the shape of the inner peripheral surface 12 of the first jig 10 may be changed to a shape similar to the contour of the workpiece 100.

Second Embodiment

[Machining Jig]

Figure 5:
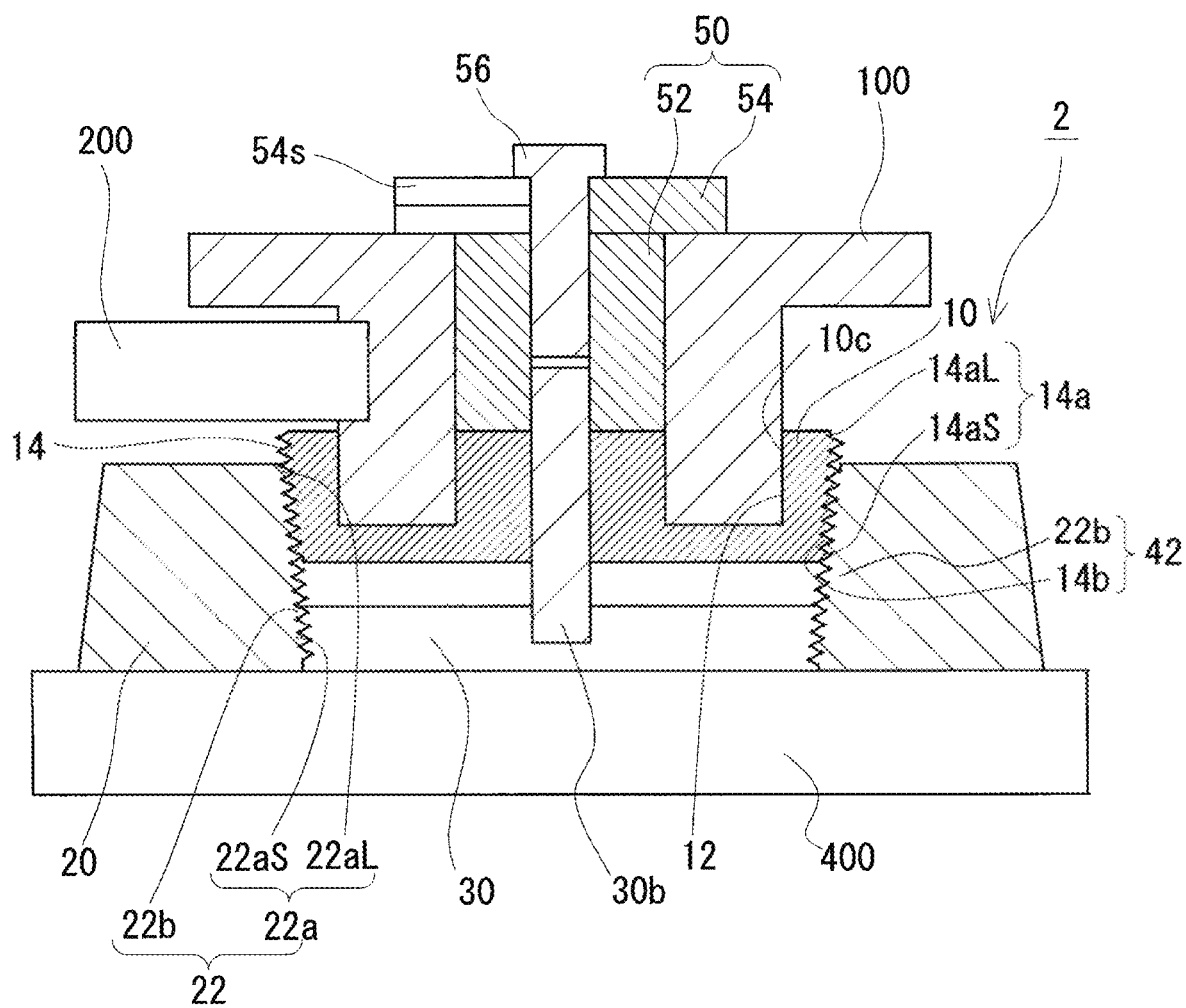
FIG. 5 is a schematic sectional view of a machining jig according to a second embodiment.

A machining jig 2 according to a second embodiment will now be described with reference to FIG. 5. The machining jig 2 is used when the outer peripheral surface of the same workpiece 100 as that in the first embodiment is cut in a similar way. As illustrated in FIG. 5, the machining jig 2 according to the second embodiment includes a first jig 10 on which the workpiece 100 can be placed, a second jig 20, a base 30 that can be formed integrally with the second jig 20, and a sliding mechanism 40 provided on the first jig 10 and the second jig 20. The machining jig 2 according to the second embodiment has characteristics similar to those of the machining jig 1 according to the first embodiment. More specifically, the machining jig 2 according to the second embodiment is characterized in that a small-diameter portion 22aS of a second inclined section 22a included in an inner peripheral surface 22 of the second jig 20 presses a large-diameter portion 14aL of a first inclined section 14a included in an outer peripheral surface 14 of the first jig 10, so that compressive stress is applied to the outer peripheral surface of the workpiece 100 at a position near a portion to be removed by the tool 200. The differences from the first embodiment will be mainly described.

First Jig

The first jig 10 is a cylindrical member having an annular groove 10c, to which the workpiece 100 can be fitted, in the top surface thereof. Among the inner peripheral surfaces of the groove 10c, an inner peripheral surface 12 that faces the small teeth 140d (FIG. 4) of the workpiece 100 (inner peripheral surface 12 of the first jig 10) has a shape similar to the contour of the workpiece 100. The first inclined section 14a of the outer peripheral surface 14 of the first jig 10 is inclined so that the diameter thereof continuously decreases with increasing distance in the direction from the top end (end at which the workpiece 100 is placed) toward the bottom end (end far from the workpiece 100) of the first jig 10. The first inclined section 14a is continuously inclined over the entire length thereof from the top end to the bottom end.

The first inclined section 14a of the first jig 10 includes an external thread portion 14b. The external thread portion 14b meshes with an internal thread portion 22b formed on the second jig 20, which will be described below. The external thread portion 14b and the internal thread portion 22b that mesh with each other enable the first jig 10 to move in the vertical direction (vertical direction in FIG. 5) when the first jig 10 is rotated with respect to the second jig 20.

Second Jig

The second jig 20 is a tubular member having open ends, and has the inner peripheral surface 22 including the second inclined section 22a that is fitted to the first inclined section 14a. Similar to the first inclined section 14a that is inclined, the second inclined section 22a is inclined so that the diameter thereof continuously decreases with increasing distance in the direction from one end (end adjacent to the workpiece 100) toward the other end (end far from the workpiece 100) of the inner peripheral surface 22. The second inclined section 22a is continuously inclined over the entire length thereof from one end to the other end. The second inclined section 22a of the second jig 20 includes the internal thread portion 22b.

Base

A shaft 30b is attached to the base 30, and the second jig 20 is coaxially fixed to the base 30. In this embodiment, the base 30 is a plate-shaped member having a bolt hole at the center, and is disposed inside a small-diameter portion of the second jig 20. In the case where the base 30 and the second jig 20 are separate components as in this embodiment, the base 30 is screwed downward into the second jig 20 from above so that the bottom surface of the base 30 and the bottom surface of the second jig 20 are flush with each other, and the base 30 and the second jig 20 are both fixed to a mounting object 400 by an attachment mechanism. Thus, the base 30 of this embodiment can be regarded as functioning as a bottom portion of the second jig 20. The bolt (shaft 30b) fixed to the bolt hole extends through the first jig 10 at the center of the first jig 10. The base 30 is mounted on the mounting object 400, which is rotatable. The base 30, the second jig 20, the first jig 10, and the workpiece 100 are coaxially arranged so that the workpiece 100 can be rotated about the shaft 30b.

The base 30 may instead be formed integrally with the second jig 20. For example, the second jig 20 may be formed as a tubular member having a bottom. The tubular member having a bottom includes a side wall portion (second jig 20) having an inner peripheral surface whose diameter decreases with increasing distance from the open end toward the bottom, and a bottom plate portion (base 30) having a bolt hole at the center. The base 30 may instead be formed integrally with the mounting object 400, or be formed integrally with the second jig 20 and the mounting object 400.

Sliding Mechanism

The external thread portion 14b provided on the first jig 10 and the internal thread portion 22b provided on the second jig 20 form a sliding mechanism 42. The sliding mechanism 42 is configured such that the external thread portion 14b and the internal thread portion 22b enable the large-diameter portion 14aL of the first inclined section 14a and the small-diameter portion 22aS of the second inclined section 22a to move toward or away from each other when the first jig 10 is rotated with respect to the second jig 20. When the large-diameter portion 14aL of the first inclined section 14a and the small-diameter portion 22aS of the second inclined section 22a approach each other, the small-diameter portion 22aS of the second inclined section 22a presses the large-diameter portion 14aL of the first inclined section 14a.

[Machining Method]

A machining method according to the second embodiment differs from the machining method according to the first embodiment in the manner in which the workpiece 100 is placed on the machining jig 2. Therefore, a method for placing the workpiece 100 on the above-described machining jig 2 will be described.

When the workpiece 100 is placed on the machining jig 2, the machining jig 2 is arranged so that the large-diameter portion 14aL of the first inclined section 14a and the small-diameter portion 22aS of the second inclined section 22a are apart from each other. The workpiece 100 is fitted to the groove 10c in the first jig 10. The first jig 10 is rotated with respect to the second jig 20 to move the first jig 10 downward. When the first jig 10 is moved downward, the large-diameter portion 14aL of the first inclined section 14a and the small-diameter portion 22aS of the second inclined section 22a approach each other. Accordingly, the small-diameter portion 22aS of the second inclined section 22a presses the large-diameter portion 14aL of the first inclined section 14a, so that the inner peripheral surface 12 of the first jig 10 comes into tight contact with the outer peripheral surface of the workpiece 100 and applies compressive stress thereto.

The machining jig 2 according to the second embodiment includes the sliding mechanism 42 provided on the first inclined section 14a and the second inclined section 22a. Accordingly, the second jig 20 can be formed integrally with the base 30 to which the second jig 20 is fixed. Thus, the machining jig 2 may be formed of two members, which are the first jig 10 and the second jig 20 (having the function of the base 30).

Test Example 1

An outer peripheral surface of a molded body (workpiece) obtained by molding a powder material was partially removed by cutting the outer peripheral surface of the molded body with a tool while applying compressive stress to the outer peripheral surface at a position near a portion to be removed by using the machining jig 1 according to the first embodiment. The thus-obtained machined product (Sample No. 1-1) was observed for chipping. In this example, a molded body including two portions of different diameters having corrugated surfaces (see FIGS. 1 and 4) was subjected to cutting to remove teeth from the outer peripheral surface of the small-diameter section over the entire circumference thereof in a region adjacent to the large-diameter section. Thus, a double sprocket wheel was produced as a machined product (see FIG. 4), the double sprocket wheel including a large-diameter section including large teeth along the outer periphery at one end thereof, a small-diameter section including small teeth along the outer periphery at the other end thereof, and a cylindrical portion disposed between the large-diameter section and the small-diameter section and having a diameter less than that of the small-diameter section.

The cutting was performed at a cutting speed of 150 m/min.

As a comparative example, an outer peripheral surface of a molded body was cut without applying compressive stress thereto, and the thus-obtained machined product (Sample No. 1-11) was observed for chipping. The molded body, machining conditions, etc. of Sample No. 1-11 were the same as those of Sample No. 1-1.

Small teeth of each of Sample No. 1-1 and Sample No. 1-11 were separated from each other, and tool micrographs (magnified 100 times) of side surfaces of the small teeth were taken and subjected to image analysis to determine the chipping area and maximum chipping depth of each small tooth. The average values of the chipping areas and maximum chipping depths of all teeth were calculated.

Figure 6:
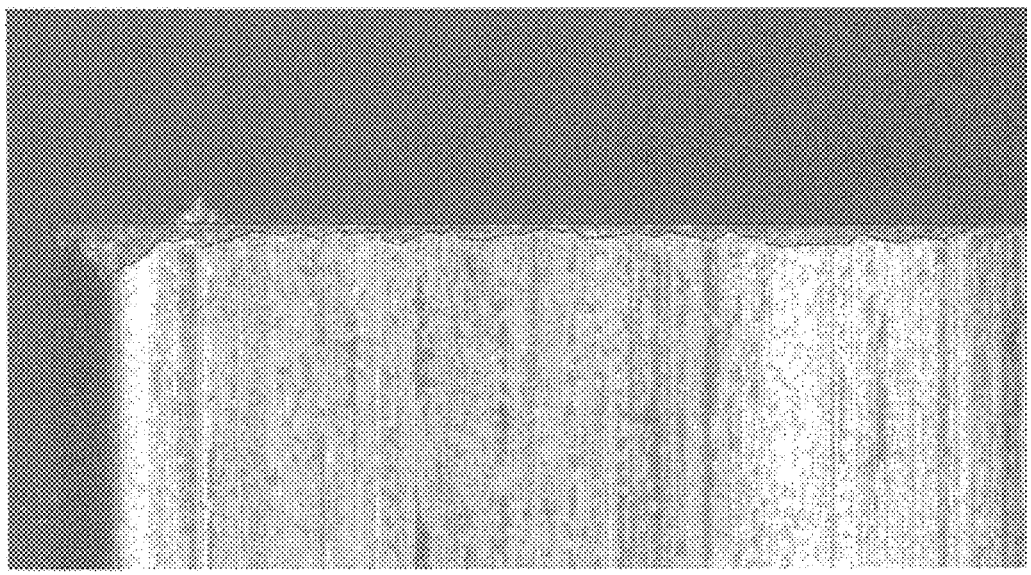
FIG. 6 is a tool micrograph of a tooth of Sample No. 1-1 in Test Example 1.
Figure 7:
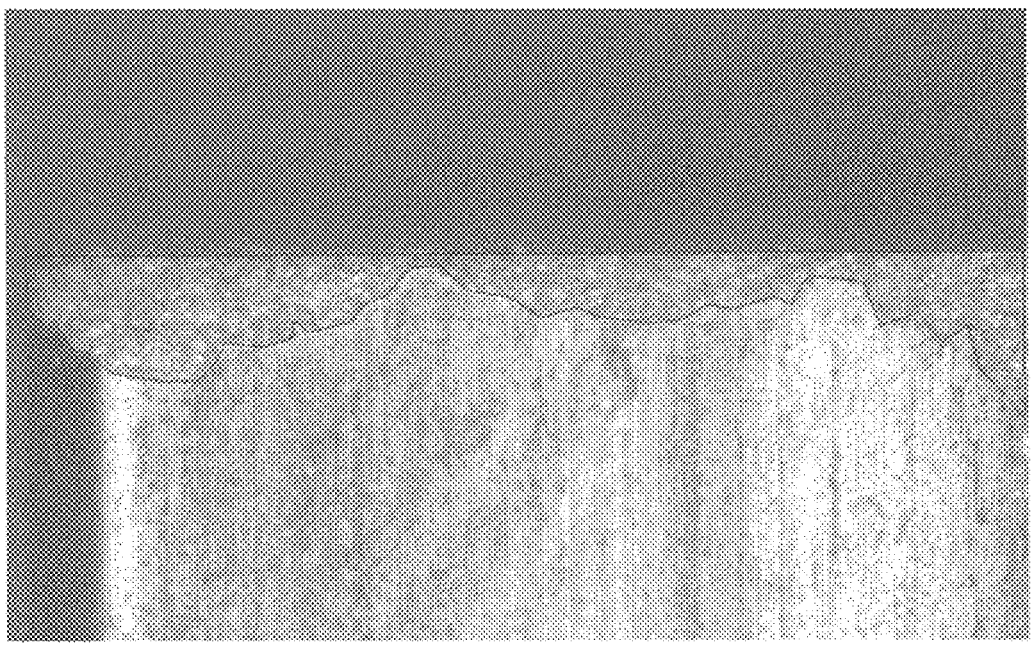
FIG. 7 is a tool micrograph of a tooth of Sample No. 1-11 in Test Example 1.

FIG. 6 shows a tool micrograph of a side surface of a specific tooth of Sample No. 1-1 at the cutting-tool exit side, and FIG. 7 shows a tool micrograph of a side surface of a specific tooth of Sample No. 1-11 at the cutting-tool exit side. In FIGS. 6 and 7, the tip of the tooth is at the left side, the root of the tooth is at the right side, and the portion enclosed by the black line is the chipped portion.

The results show that for Sample No. 1-11, which was cut without applying compressive stress at a position near the portion subjected to cutting, the chipping area was 1.1 mm$^2$ and the maximum chipping depth was 1200 µm when the machining time was 20 s/piece (see FIG. 7). In contrast, for Sample No. 1-1, which was cut while compressive stress was applied thereto at a position near the portion subjected to cutting, the chipping area was 0.5 mm$^2$ and the maximum chipping depth was 500 µm even when the machining time was 10 s/piece (see FIG. 6). This shows that by applying compressive stress at a position near the portion subjected to cutting, the machining time can be reduced and the occurrence of chipping during cutting can also be reduced.

It is to be understood that the embodiments disclosed herein are illustrative in all aspects and not restrictive in any way. The present invention is not limited to these illustrations, but is defined by the scope of the claims and intended to include equivalents to the scope of the claims and all modifications within the scope. For example, the form of the workpiece (whether the workpiece is a molded body or a sintered body and the shape, size, etc. of the workpiece) and the machining conductions (whether the workpiece is to be formed into an undercut shape) may be changed as appropriate. In addition, although the workpiece rotates and the tool rotates and revolves in the embodiments, the workpiece may instead be fixed while the tool is rotated and revolved. Alternatively, the workpiece may be cut by causing the workpiece to rotate while the tool is fixed (neither rotates nor revolves).

REFERENCE SIGNS LIST 1, 2 machining jig, 10 first jig, 10c groove, 12 inner peripheral surface, 12a compression surface, 12b fitting surface, 12c step surface, 14 outer peripheral surface, 14a first inclined section, 14aL large-diameter portion, 14aS small-diameter portion, 14b external thread portion, 16 slit, 20 second jig, 22 inner peripheral surface, 22a second inclined section, 22aL large-diameter portion, 22aS small-diameter portion, 22*b* internal thread portion, 24 outer peripheral surface, 30 base, 30*h* through hole, 30*b* shaft, 32 top surface, 32*c* recess, 34 projecting portion, 34*a* placement surface, 34*b* external thread portion, 36 attachment portion, 36*h* insertion hole, 36*b* bolt, 40, 42 sliding mechanism, 50 retaining portion, 52 inner retaining portion, 52*p* projection, 52*h* through hole, 54 top retaining portion, 54*s* slit, 56 retaining shaft, 100 workpiece, 120 large-diameter section, 140 small-diameter section, 120*d* large teeth, 140*d* small teeth, 200 tool, 300 machined product, 320 large-diameter section, 340 small-diameter section, 360 cylindrical portion, 320*d* large teeth, 340*d* small teeth, 400 mounting object

The invention claimed is:

1. A machining jig that holds a workpiece with respect to a tool that partially removes an outer peripheral surface of the workpiece, the machining jig comprising:
    a first jig including an inner peripheral surface having a shape similar to a contour of the workpiece and an outer peripheral surface including a first inclined section inclined with respect to an axial direction of the workpiece;
    a second jig including an inner peripheral surface including a second inclined section configured to be fitted to the first inclined section;
    a base to which the second jig is coaxially fixed; and
    a sliding mechanism that enables a large-diameter portion of the first inclined section and a small-diameter portion of the second inclined section to move toward and away from each other,
    wherein the sliding mechanism causes the small-diameter portion of the second inclined section to press the large-diameter portion of the first inclined section so that compressive stress is applied to the outer peripheral surface of the workpiece at a position to be removed by the tool, and
    wherein the sliding mechanism includes
        an internal thread portion formed continuously from the large-diameter portion of the second inclined section, and
        an external thread portion that is provided on the base and meshes with the internal thread portion.

2. The machining jig according to claim 1, wherein the first jig has a slit formed in the inner peripheral surface of the first jig along an axial direction thereof so that a diameter of the first jig decreases as the large-diameter portion of the first inclined section approaches the small-diameter portion of the second inclined section.

3. The machining jig according to claim 1, wherein the machining jig is used to form the outer peripheral surface of the workpiece into an undercut shape.

4. A machining method for partially removing an outer peripheral surface of a workpiece by using a tool, the machining method comprising:
    applying compressive stress to the outer peripheral surface of the workpiece at a position to be removed by the tool by using the machining jig according to claim 1 and machining the workpiece while the compressive stress is applied.

5. A machining jig that holds a workpiece with respect to a tool that partially removes an outer peripheral surface of the workpiece, the machining jig comprising:
    a first jig including an inner peripheral surface having a shape similar to a contour of the workpiece and an outer peripheral surface including a first inclined section inclined with respect to an axial direction of the workpiece;
    a second jig including an inner peripheral surface including a second inclined section configured to be fitted to the first inclined section;
    a base to which the second iig is coaxially fixed; and
    a sliding mechanism that enables a large-diameter portion of the first inclined section and a small-diameter portion of the second inclined section to move toward and away from each other,
    wherein the sliding mechanism causes the small-diameter portion of the second inclined section to press the large-diameter portion of the first inclined section so that compressive stress is applied to the outer peripheral surface of the workpiece at a position to be removed by the tool, and
    wherein the sliding mechanism includes
        an external thread portion provided on the first inclined section, and
        an internal thread portion that is provided on the second inclined section and meshes with the external thread portion.

6. The machining jig according to claim 5, wherein the first jig has a slit formed in the inner peripheral surface of the first jig along an axial direction thereof so that a diameter of the first jig decreases as the large-diameter portion of the first inclined section approaches the small-diameter portion of the second inclined section.

7. The machining jig according to claim 5, wherein the machining jig is used to form the outer peripheral surface of the workpiece into an undercut shape.

8. A machining method for partially removing an outer peripheral surface of a workpiece by using a tool, the machining method comprising:
    applying compressive stress to the outer peripheral surface of the workpiece at a position to be removed by the tool by using the machining jig according to claim 5 and machining the workpiece while the compressive stress is applied.

* * * * *